M. K. HOLMES.
GLASS FURNACE.
APPLICATION FILED JUNE 8, 1914.
1,193,788.
Patented Aug. 8, 1916.
2 SHEETS—SHEET 1.
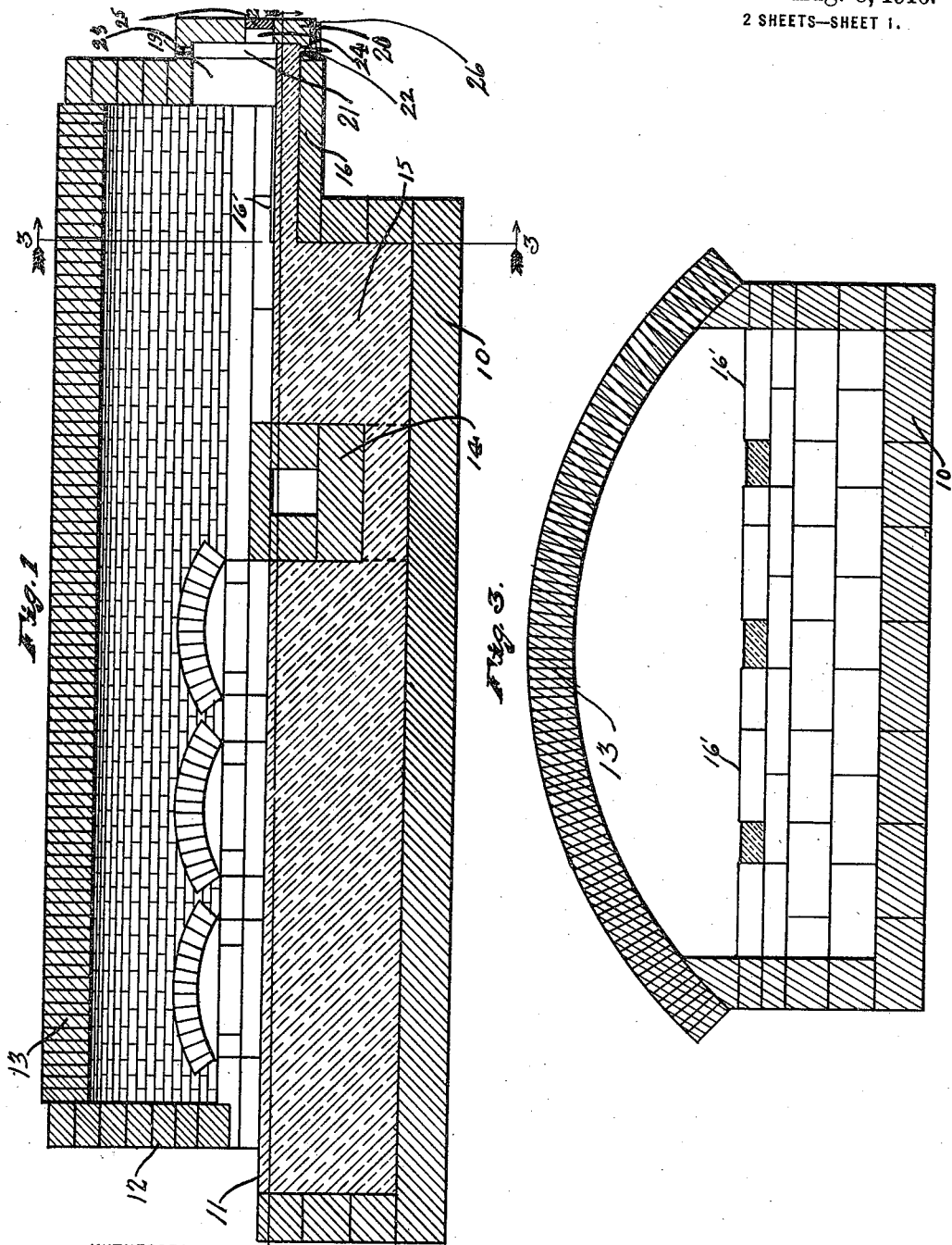
WITNESSES:
INVENTOR
MINOT K. HOLMES.
BY
ATTORNEY

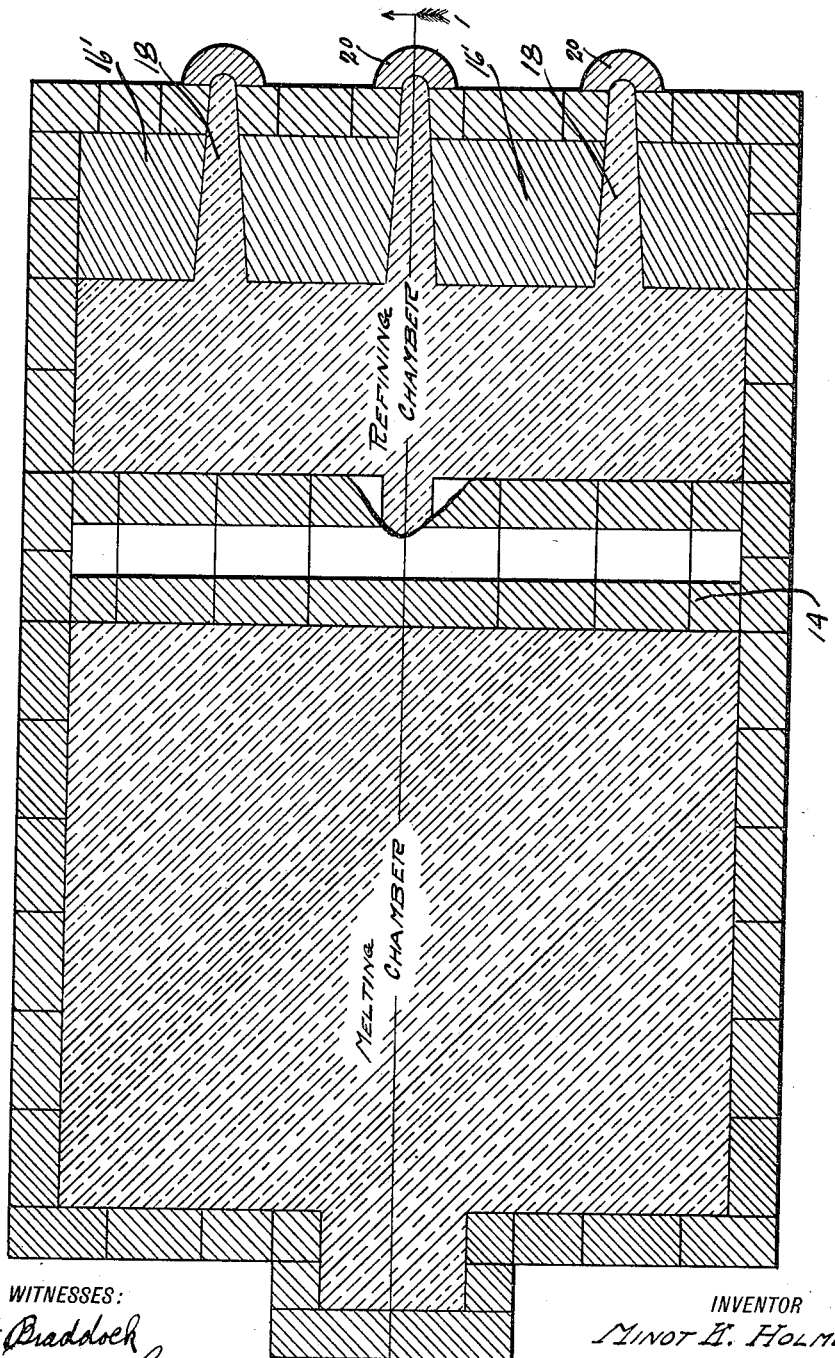

UNITED STATES PATENT OFFICE.

MINOT K. HOLMES, OF MUNCIE, INDIANA, ASSIGNOR TO HEMINGRAY GLASS COMPANY, OF MUNCIE, INDIANA, A CORPORATION OF KENTUCKY.

GLASS-FURNACE.

1,193,788.  Specification of Letters Patent.  Patented Aug. 8, 1916.

Application filed June 8, 1914. Serial No. 843,658.

*To all whom it may concern:*

Be it known that I, MINOT K. HOLMES, a citizen of the United States, residing at Muncie, in the county of Delaware and State of Indiana, have invented a new and useful Glass-Furnace, of which the following is a specification.

It has heretofore been common to deliver from a glass melting furnace a continuous stream of glass and difficulty has been experienced in delivering the glass to the outlet opening of the furnace in a uniform condition such that successively cut off portions of the stream might be manipulated in the formation of commercial articles of glassware. In such prior furnaces it has been customary to form, at the delivery end of the furnace, a comparatively small extension which has been commonly called a "dog house". This extension has been in the form of a comparatively small chamber, the floor of which was elevated considerably above the floor of the main body of the refining end of the furnace and, while considerably wider than the delivered stream, was nevertheless quite narrow as compared with the furnace and of such form that the hot gases from the furnace could not well penetrate into the extension, and it has been necessary heretofore to supplementally heat the interior of the extension, and the glass therein, by means of gas or oil flames projected into the chamber through the wall thereof. While such a practice has been fairly satisfactory, difficulties have been experienced both because of the variations in the temperatures of the glass in different parts of the extension and also because of the deposit of carbon particles upon the surface of the glass resulting from incomplete combustion of the fuel. Variation in temperatures due to the fact that the chamber walls were comparatively distant from the outlet opening and, as the major flow took place along lines converging from the refining chamber toward the outlet opening, there would be stagnant portions of the glass in the chamber which could only be heated with great difficulty and much expenditure of fuel.

The object of my present invention is to produce a furnace especially designed for the delivery of one or more continuous streams of glass in the best possible condition for molding into articles and to maintain the stream or streams at the lowest possible temperatures consistent with proper working of glass after it is discharged from the furnace.

The accompanying drawings illustrate my invention.

Figure 1 is a longitudinal vertical section on line 1—1 of Fig. 2; Fig. 2 a plan on line 2—2 of Fig. 1; and Fig. 3 a transverse section on line 3—3 of Fig. 1.

In the drawings, 10 indicates the bed of a glass furnace, 11 the feed or receiving end, 12 the receiving end wall, 13 the arch, and 14 the refining bridge, all of usual form. At the delivery end of the refining chamber 15, however, I provide an elevated floor 16 which, however, is below the normal level of glass in the furnace by several inches. This floor 16 is extended from the main body of the furnace by a sufficient amount to accommodate machines which are to be served from the furnace and at its forward end is erected the delivery end wall 17, the arch 13 being carried clear to this wall. As many delivery openings may be provided as desired within the capacity of the furnace and in Fig. 2 I have indicated three of such delivery openings, that number being about the capacity of the furnace shown and upon the floor 16 I erect several platforms 16', 16', the tops of which rise slightly above the normal level of glass and the adjacent edges of which are slightly inclined and separated so as to form between their substantially vertical adjacent edges slightly tapered channels 18 which connect with openings 19 formed through the delivery end wall 17, the openings 19 having a vertical extent several times greater than the height of the platforms 16'.

Over the outer end of each opening 19 I place a flow block 20 which is conveniently semi-cylindrical and provided upon its inner vertical face with a semi-cylindrical channel 21 which registers with and completes the outer end of the opening 19 and is not very much larger than the delivery opening 22 which is formed in its lower wall. In its upper end the block 20 is provided with an opening 23 through which may be introduced a burner so that flame may be applied directly to the glass within the flow block after the delivery opening has been allowed to freeze up. Through the vertical wall of the block 20 is formed an inspection opening 24 in which is normally placed a stopper or plug 25. Block 20 may be pointed into or to wall 17 in any desired manner and in practice it is advisable to also equip the lower end of this flow block with a metal valve 26 by means of which the effective opening of the delivery opening 22 may be varied.

The platforms 16' are so arranged as to cause the delivery of molten glass directly from the refining chamber through the channels 18 to the delivery openings 22, without the possibility of any material areas of stagnant glass close to the end walls of the furnace. The entire refining chamber lies so well in front of the delivery end of wall 17 and, as the arch 13 extends for a considerable distance beyond this refining chamber, the entire mass of glass in the refining chamber is of substantially uniform temperature and consistency and, as the arch 13 also extends over the entire length of the platforms 16', these platforms are also of the same temperature as the body of glass in the refining chamber and consequently each stream of glass in the channel 18 is flanked by walls which are of the same temperature as the glass and, therefore, produce no chilling effect upon the streams. As a consequence, the streams arrive at the outlet openings 22 in substantially the same condition and at the same temperature as the glass in the refining chamber and, while there is some chilling immediately adjacent the outlet opening yet nevertheless the hot gases, because of the height of the openings 19 in the delivery end wall, have free play upon the streams throughout their entire length and, as they are comparatively narrow, there is no difficulty in maintaining the desired uniformity in the inner stream throughout its entire length.

I claim as my invention:

1. A glass furnace comprising a main bed, a floor at the delivery end of the main bed elevated above the main bed and lying below the normal level of glass, a delivery end wall erected at the delivery end of said elevated floor and having a delivery opening of material vertical extent therethrough, a flow block provided with a delivery chamber arranged to cover said opening, said flow block having a delivery opening formed through its bottom, and platforms erected upon said elevated floor with their upper faces above the normal glass level and laterally separated to form a channel registering with the opening in the delivery end of the wall.

2. A glass furnace comprising a main bed, a floor at the delivery end of the main bed elevated above the main bed and lying below the normal level of glass, a delivery end wall erected at the delivery end of said elevated floor and having a delivery opening of material vertical extent therethrough, a flow block provided with a delivery chamber arranged to cover said opening, said flow block having a delivery opening formed through its bottom, and platforms erected upon said elevated floor and laterally separated to form a channel registering with the opening in the delivery end of the wall.

3. A glass furnace comprising a main bed, a floor at the delivery end of the main bed elevated above the main bed and lying below the normal level of glass, a delivery end wall erected at the delivery end of said elevated floor and having a delivery opening of material vertical extent therethrough, and a flow block provided with a delivery chamber arranged to cover said opening, said flow block having a delivery opening formed through its bottom.

In witness whereof, I have hereunto set my hand at Muncie, Indiana, this third day of June, A. D. one thousand nine hundred and fourteen.

MINOT K. HOLMES.

Witnesses:
JAMES G. MENDENHALL,
CHAS. E. HAWK.

Copies of this patent may be obtained for five cents each, by addressing the "Commissioner of Patents, Washington, D. C."